United States Patent
Tomaiuolo

[15] 3,651,285

[45] Mar. 21, 1972

[54] TELEPHONE HANDSET ATTACHMENT FOR FACILITATING DIRECTORY READING

[72] Inventor: Theodore J. Tomaiuolo, 16 Standish St., Hartford, Conn. 06114

[22] Filed: Mar. 9, 1970

[21] Appl. No.: 17,455

[52] U.S. Cl. ............ 179/178

[51] Int. Cl. ............ H04m 1/21

[58] Field of Search ............ 179/178, 184, 187; 40/336, 40/338

[56] References Cited

UNITED STATES PATENTS

| | | | |
|---|---|---|---|
| 1,508,434 | 9/1924 | Ayres | 179/178 X |
| 3,448,258 | 6/1969 | Vallas | 240/2 |
| 1,358,642 | 11/1920 | Lague | 179/178 X |

*Primary Examiner*—Kathleen H. Claffy
*Assistant Examiner*—Thomas W. Brown
*Attorney*—Fishman and Van Kirk

[57] ABSTRACT

A telephone attachment adapted to fit over the ear piece or mouthpiece of a telephone handset as an aid to locating a telephone listing. The attachment is in the form of a tab having a rectangular aperture at one end that can be flattened against the telephone directory by manipulating the handset. The aperture is commensurate in size with a telephone listing so that a listing, once located in the aperture, is highlighted for the telephone user while the telephone number is dialed.

8 Claims, 3 Drawing Figures

PATENTED MAR 21 1972 3,651,285
FIG. 3
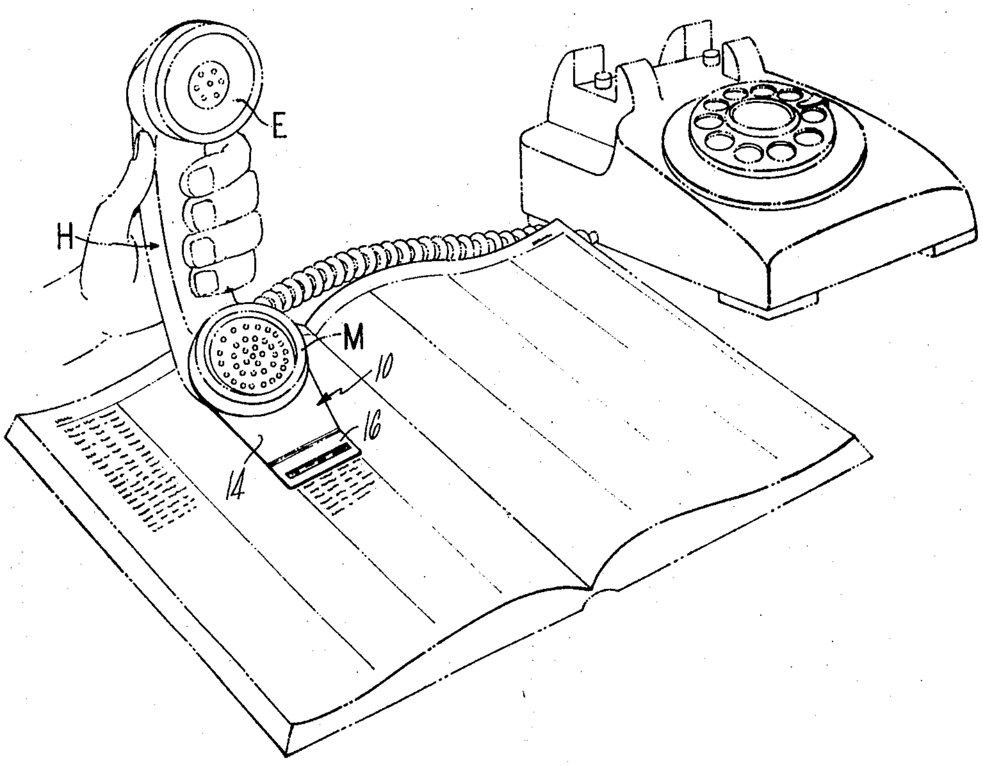
FIG. 1, FIG. 2
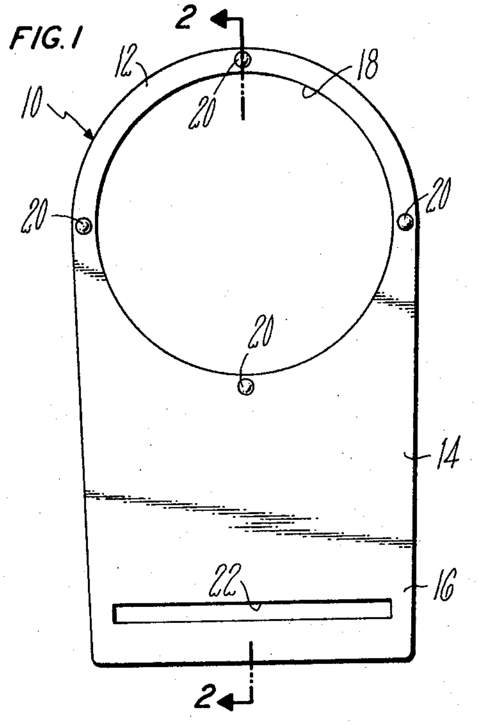
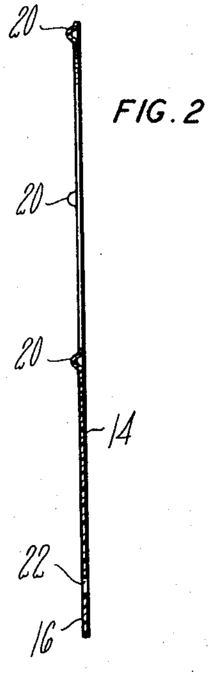
INVENTOR
THEODORE J. TOMAIUOLO
BY Fishman and Van Kirk
ATTORNEYS

TELEPHONE HANDSET ATTACHMENT FOR FACILITATING DIRECTORY READING

BACKGROUND OF THE INVENTION

1. Field of the Invention

This invention relates to the field of telephones and more particularly to the field of telephone attachments which facilitate the use of a telephone.

2. Description of the Prior Art

The telephone has prompted the development of many different attachments which facilitate the operation of the telephone.

Two attachments of general interest with respect to the present invention were introduced early in the history of telephones and are disclosed in U.S. Pat. Nos. 793,826 and 826,336. These devices are generally employed to support a card or tag containing information or numbers that were useful to the party making the call.

One problem occasionally experienced by many people is the loss of a telephone number shortly after it has been located among the many listings on a page in a telephone directory. The numerous listings in the directory are in small print and are not conducive to immediate location after a brief glance away from the page. Frequently an individual may locate the desired number and, in the process of dialing, the number may be lost among the maze of listings.

One obvious solution to the problem entails writing the number down on a separate slip of paper prior to dialing the phone. While writing the number down is not particularly difficult, it is a burdensome, time-consuming step and may be aggravated by the nonavailability of either paper or pencil.

It is accordingly an object of the present invention to disclose a telephone attachment which will aid the telephone user in locating a telephone listing in a directory while dialing.

It is a further object of the present invention to disclose a telephone attachment which makes it unnecessary to transcribe a desired telephone number from the directory to a separate piece of paper prior to dialing.

Other objects and advantages of the novel telephone attachment will become apparent from the drawings and following specification.

SUMMARY OF THE INVENTION

The invention relates to a telephone attachment which aids in locating a listing in a telephone directory.

The telephone attachment is formed from a sheet of metal or plastic in the shape of an elongated tab. One end of the tab has an aperture which mates with a mounting surface on the handset of a telephone. The opposite end of the tab has a rectangular slot which is approximately the same size as a listing in a telephone directory.

When the attachment is secured to a telephone handset, the slotted end can be flattened against the page of a telephone directory simply by manipulating the handset. A listing, once located in the rectangular slot, is highlighted for the telephone user while the number is dialed.

BRIEF DESCRIPTION OF THE DRAWING

The novel telephone attachment is shown in the drawing wherein corresponding parts are given like reference numerals in the several figures.

FIG. 1 shows the details of the telephone attachment in a front view.

FIG. 2 is a cross-sectional view of the telephone attachment as seen along the line 2—2 in FIG. 1.

FIG. 3 shows the telephone attachment while highlighting a telephone listing.

DESCRIPTION OF THE PREFERRED EMBODIMENTS

The novel telephone attachment, generally designated 10, is seen in one form in FIGS. 1 and 2. The attachment is a generally flat, flexible, elongated tab member comprised of a ring portion 12, a central portion 14 and a slotted end portion 16.

The ring portion 12 has a large central aperture 18 and has a size and shape commensurate with mounting surfaces on either the earpiece or the mouthpiece of the handset on a telephone. If desired, the ring portion 12 may have a number of dimples 20 distributed at intervals on the face of the tab. The dimples 20 may be formed together with the tab member itself by a die-stamping process. If the tab is formed from a thermosetting plastic material, it may be desirable to employ a small amount of heat to the dies so that the dimples will be permanently set in the face of the tab.

The slotted portion 16 lies on the opposite side of the central portion from the ring portion 12. The slotted portion 16 contains a rectangular aperture 22 which extends transversely of the elongated tab member. The rectangular aperture 22 has a size commensurate with listings in a telephone directory.

The attachment 10 may be formed from a number of different materials. In one form, the attachment 10 may be stamped from a sheet of flexible plastic. In another form, the attachment 10 may be stamped from a thin sheet of metal, particularly a ductile sheet metal which can be easily flexed.

As seen in FIG. 3 the attachment 10 is mounted to the handset H of a telephone. The attachment 10 may be secured to the handset H by removing either the earpiece E or the mouthpiece M, slipping the ring portion 12 over the threaded portion of the handset H and reassembling the earpiece E or mouthpiece M on the handset to clamp the ring portion 12 in place. Since some telephone handsets may have an annular slot between the earpiece or mouthpiece and the handle of the of the handset, the dimples 20 may be needed to fill the annular space and provide sufficient frictional contact between the handset and the attachment 10 to prevent the attachment 10 from hanging loosely from the handset.

The attachment 10 clamped securely to the handset H serves as a fixed extension of the handset and can be manipulated on the page of a telephone directory by the telephone user. The slotted portion 16 of the flexible attachment 10 may be flattened against the page or, if desired, the portion 16 may be permanently set during the die-stamping process at a small angle to the rest of the tab as shown so that the portion 16 lies flat on the page. When the telephone user has located a listing, he simple centers the listing within the rectangular aperture 22 to highlight the listing and block out adjacent listings. He then proceeds to dial his number. There is little opportunity for the number to be lost and the user does not have to write the number down on a separate slip of paper.

While the novel telephone attachment has been described in several embodiments, it will be understood that various modifications and substitutions can be made to the form and materials of the attachment without departing from the scope of the invention. It may be desirable to orient the slot 22 in a different direction. A magnifying glass may be mounted in the slot to enlarge the particular listing being dialed. Also, the length of the central portion 14 may be varied for particular uses. For example, it may be desirable to distribute the attachment 10 for advertising in which case advertising information may be embossed on an extended central portion 14. It will therefore be understood that the novel telephone attachment has been described by way of illustration rather than limitation.

What is claimed is:

1. A telephone handset attachment for locating a particular listing in a telephone directory comprising:

a flexible elongated tab member having a mounting portion at one end, a slotted portion at the opposite end, and an intervening central portion, the slotted portion having a rectangular aperture commensurate in size with a telephone listing and the mounting portion having a mounting aperture commensurate in size with a selected mounting surface on the handset of a telephone.

2. The telephone attachment of claim 1 wherein:

the tab member is formed from a sheet of flexible plastic material.

3. The telephone attachment of claim 1 wherein: the tab member is formed from a sheet of metal.

4. The telephone attachment of claim 1 in which: the slotted portion is set at an angle with respect to the ring portion.

5. The telephone attachment of claim 1 wherein: the central portion is tapered between the mounting portion at one end and the slotted portion at the other end.

6. The telephone attachment of claim 1 wherein: the mounting portion is a ring portion having a central aperture commensurate in size and shape with mounting surfaces at the interface of the earpiece and handle of the handset.

7. The telephone attachment of claim 1 wherein: the mounting portion is a ring portion having a central aperture commensurate in size and shape with mounting surfaces at the interface of the mouthpiece and handle of the handset.

8. The telephone attachment of claim 1 wherein: the mounting portion is a ring portion having a dimpled surface contiguous with a face of the tab member.

* * * * *